Jan. 20, 1925.

J. McP. COOKE 1,523,931

STITCHING AND PERFORATING MACHINE

Filed Aug. 29, 1922   5 Sheets-Sheet 3

Inventor.
John McP. Cooke.
by Heard Smith & Tennant.
Attys.

Jan. 20, 1925.
J. McP. COOKE
1,523,931
STITCHING AND PERFORATING MACHINE
Filed Aug. 29, 1922     5 Sheets-Sheet 4
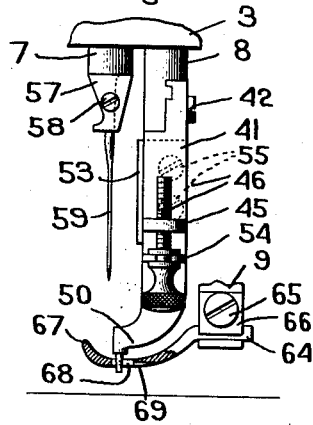
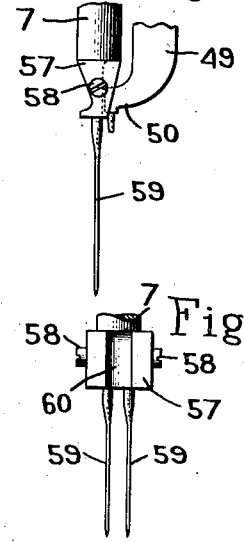
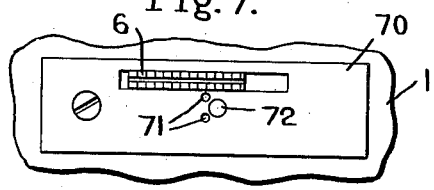
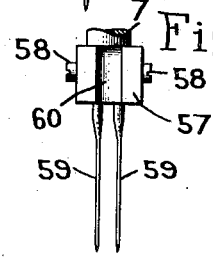
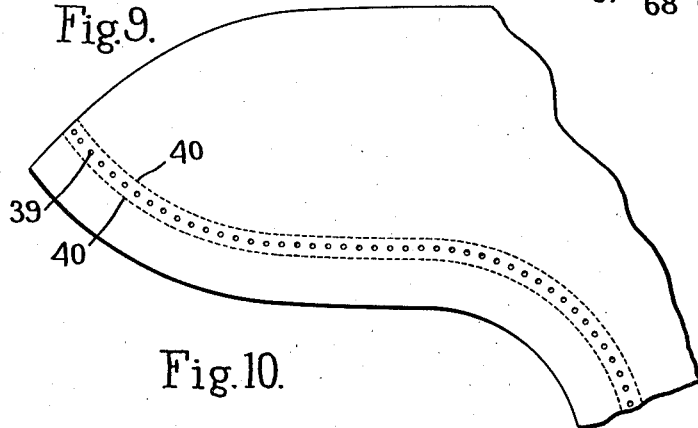
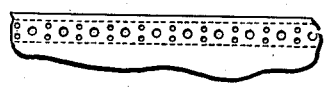
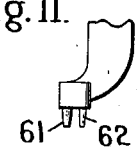
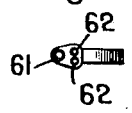
Inventor.
John McP. Cooke.
by Heard Smith & Tennant.
Attys.

Jan. 20, 1925.
J. McP. COOKE
1,523,931
STITCHING AND PERFORATING MACHINE
Filed Aug. 29, 1922   5 Sheets-Sheet 5
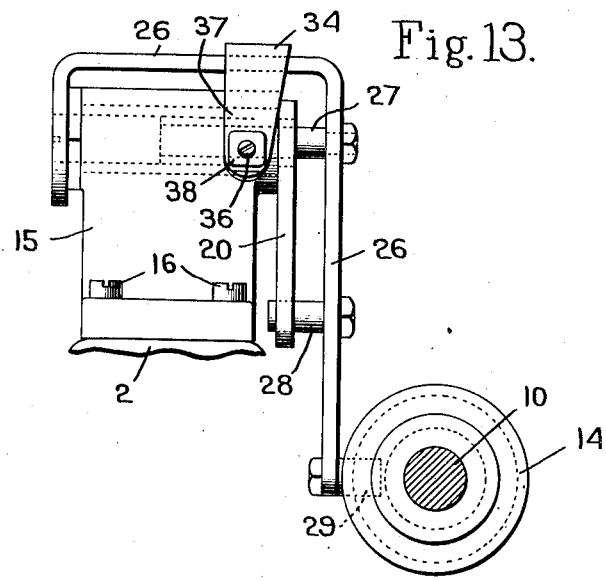
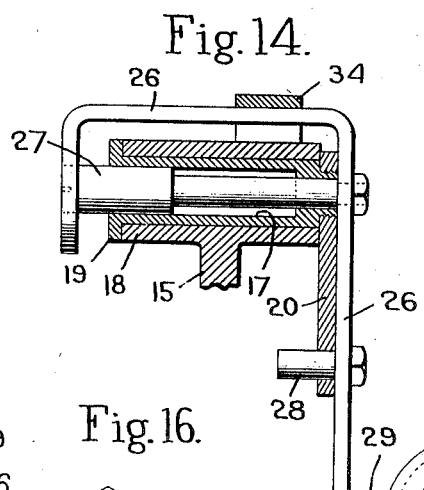
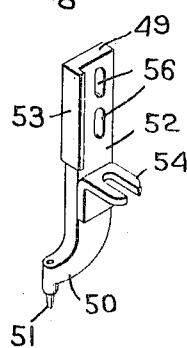
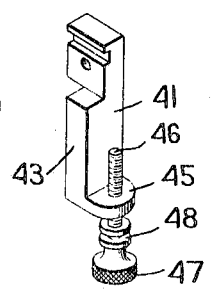
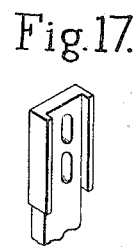
Inventor.
John McP. Cooke.
by Heard Smith & Tennant.
Attys.

Patented Jan. 20, 1925.

1,523,931

UNITED STATES PATENT OFFICE.

JOHN McPHERSON COOKE, OF REVERE, MASSACHUSETTS, ASSIGNOR TO NICHOLAS W. MATHEY, OF MELROSE, MASSACHUSETTS.

STITCHING AND PERFORATING MACHINE.

Application filed August 29, 1922. Serial No. 585,104.

*To all whom it may concern:*

Be it known that I, JOHN McP. COOKE, a citizen of the United States, and resident of Revere, county of Suffolk, State of Massachusetts, have invented an Improvement in Stitching and Perforating Machines, of which the following description, in connection with the accompanying drawing, is a specification, like characters on the drawing representing like parts.

This invention relates to a machine for performing a stitching and perforating or punching operation simultaneously. Such machines may operate on various materials but are more particularly designed for stitching and punching the edges of leather parts of boots and shoes. The main object of the perforations formed in the material is ornamental and it is, therefore, highly important that the line of perforations shall at all times be symmetrically disposed with respect to the stitching, not only when the work is performed on a straight line, but also where it is performed around the various curves and angles required.

The invention has for its object to provide a combined stitching and perforating machine which shall simultaneously form in the material two parallel rows of stitching and one or more intermediate symmetrically disposed rows of perforations.

The object of the invention is further to provide a construction in such a machine in which the punch holder may be accurately positioned on the punch bar and accurately adjusted thereon without requiring any material skill on the part of the operator, thus enabling punch holders provided with various sizes and combinations of punches readily and accurately to be placed in working position.

The object of the invention is further to provide a construction by which the punch may operate in a path close to the paths of the needles, thus enabling the appearance and symmetry of the work to be maintained on curves and angles of varying degree.

The object of the invention is further to provide a construction in which a plurality of perforations may symmetrically and accurately be formed between parallel rows of stitches simultaneously with the formation of said stitches.

The object of the invention is further to provide a presser foot extending beneath the punch and between the needles, thus enabling the material operated upon to be guided and fed accurately through the machine.

The object of the invention is further to provide new and improved mechanism for operating the punch bar, for limiting the elevated position of the punch bar, for permitting the engagement and disengagement of the means for reciprocating the punch bar and for neutralizing the effect of any lost motion in this operating means.

These and other objects and features of the invention will appear more fully from the accompanying description and drawings and will be particularly pointed out in the claims.

The drawings show a preferred form of the invention embodied in a machine, the general construction and many of the features of which are well known and familiar to those skilled in the art and hence need no extended illustration or description. Only so much of the machine as is desirable for a disclosure of the present invention is, therefore, illustrated.

In the drawings;

Fig. 4 is a detail in side elevation and partially in vertical cross section showing the lower ends of the needle, punch, and presser foot bars and connected parts:

Fig. 5 is a detail in side elevation showing the lower ends of the needle bar and punch holder in a different position from that in Fig. 4;

Fig. 6 is a detail in rear elevation in the lower end of the needle bar;

Fig. 7 is a top plan view of a portion of the bed plate of the machine showing the throat plate and feed dog;

Fig. 8 is a top plan view of the presser foot;

Fig. 9 is a plan view of a portion of a shoe vamp showing one form of work performed by the machine;

Fig. 10 is a plan view of a section of material showing another form of work performed by the machine;

Fig. 11 is a detail in side elevation of the lower end of a punch holder fitted with a plurality of punches;

Fig. 12 is a bottom plan view of the construction shown in Fig. 11;

Fig. 13 is a right hand end elevation of the mechanism for operating the punch bar;

Fig. 14 is a view similar to Fig. 13 but chiefly in vertical cross section;

Fig. 15 is a perspective view of the punch holder;

Fig. 16 is a perspective view of the lower end of the punch bar;

Fig. 17 is a perspective view of the upper end of another form of punch holder;

Figure 1:
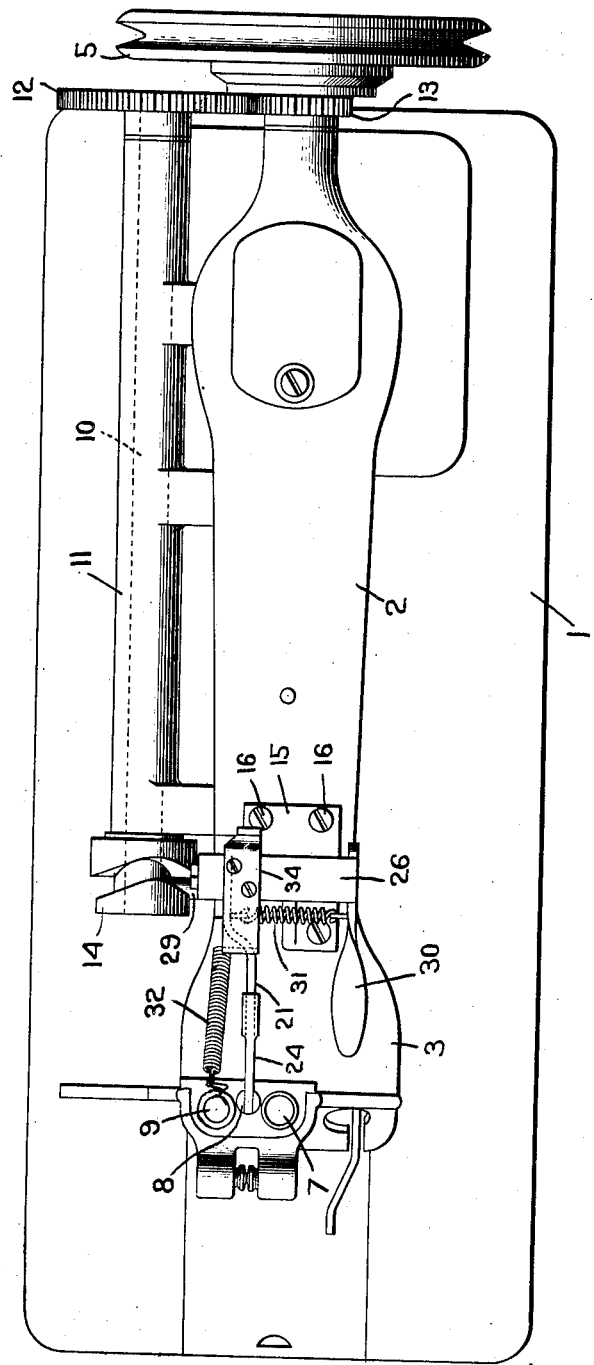
Fig. 1 is a top plan view of the machine embodying a preferred form of the invention.
Figure 2:
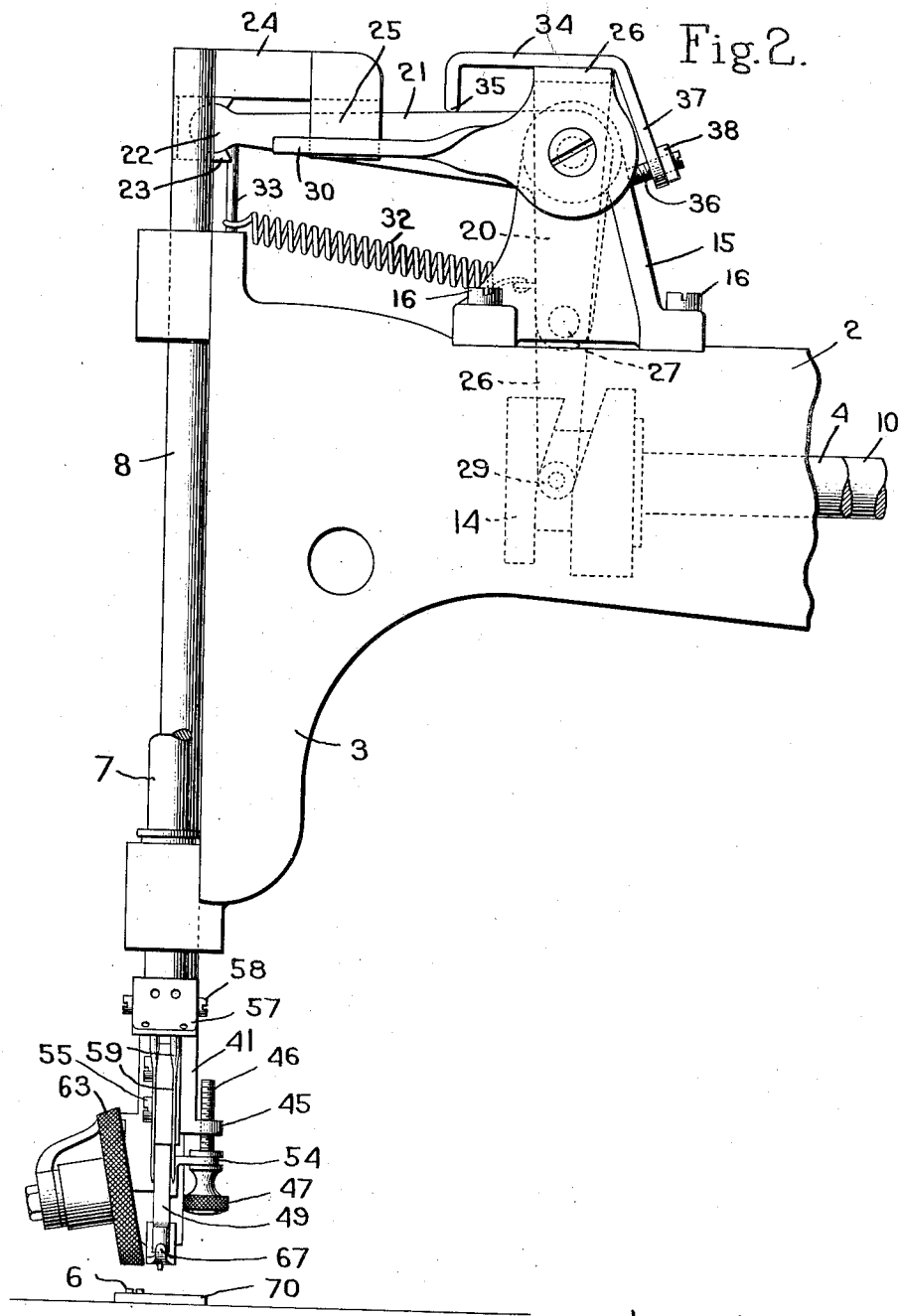
Fig. 2 is a front elevation of the left hand end of the machine.

The machine as illustrated comprises a bed plate 1 supported from a suitable base and provided with the usual overhanging arm 2 terminating in a vertical head 3. The main shaft 4 of the machine extends horizontally through the overhanging arm and is driven by a pulley 5 from a suitable source of power.

The stitch forming mechanism comprises two needles operated from the overhanging arm and co-operating with suitable complementary stitch forming mechanism below the bed plate. The latter not being specifically involved in the invention is not illustrated and may be of any suitable type. The material to be operated upon is fed through the machine from front to rear by means of a suitable feed mechanism which may be a four motion feed dog 6 operated from beneath the bed plate in the usual manner. Suitable devices are, of course, provided for taking up the stitch, applying the necessary tension, etc. and may be of any suitable type.

At the left of the machine in the head 3 are mounted one behind the other the vertically reciprocable needle bar 7, the vertically reciprocable punch bar 8 and the vertically movable presser foot bar 9. The needle bar 7 is reciprocated from the main shaft 4 of the machine by any suitable and usual connections and preferably so as to have one complete reciprocation for each rotation of the shaft.

The punch bar 8 preferably has a less number of reciprocations than the needle bar and as illustrated has one reciprocation for each two reciprocations of the needle bar, but the relation between the reciprocations of these two bars may be arranged as desired for the work to be performed. This punch bar may also be disconnected from its driving mechanism and elevated so as to be inoperative whenever required during the stitching operation.

The mechanism for reciprocating the punch bar and for engaging it with and disengaging it from the mechanism by which it is driven is in many respects novel. An auxiliary shaft 10 is mounted in a casing or bracket 11 secured to or cast integrally with the overhanging arm 2 and extends parallel to the main shaft 4 at the rear of the overhanging arm. At its right hand end a gear 12 secured to the auxiliary shaft 11 engages a pinion 13 secured to the main shaft 4 or pulley 5 and by changing the relation between these two gears the number of rotations of the auxiliary shaft 11 with respect to the main shaft 4 is readily determined. At its left hand end the auxiliary shaft 11 carries a barrel cam 14. A bracket 15 is mounted as by set screws 16 on the top of the overhanging arm. In this bracket is journalled a lever mechanism from which the rotary motion of the cam 14 is transformed into a reciprocating motion to effect the operation of the punch bar. In the construction illustrated a sleeve 17 is journalled in the hub 18 forming the upper portion of the bracket 15. The head 19 of this sleeve abuts against the front end of the hub and at its rear end the sleeve has threaded thereon or otherwise secured thereto a bell crank lever comprising the depending arm 20 and the horizontally projecting arm 21. At its left hand end the arm 21 is provided with a circular end 22 seated in a block 23 mounted to slide in a slot in the punch bar 8. An arm 24 is rigidly secured in the upper end of the punch bar and forms the upper surface of the slot for guiding the block 23. At its right hand end this arm has a depending bifurcated portion 25 straddling the arm 21 of the lever and thus preventing rotary movement of the punch bar. It will be seen that when the bell crank lever is rocked the punch bar will be reciprocated vertically. In order to rock the bell crank lever 20, 21 an auxiliary lever 26 is employed. This auxiliary lever at its upper end is loop shaped and secured to both ends of a shouldered shaft 27 journalled in the sleeve 17 and as the shaft 27 is longer than the sleeve a backward and forward sliding movement of the lever 26 with respect to the sleeve may take place. The lever 26 is guided in this sliding movement by a pin 28 secured thereto and projecting through an aperture in the depending arm 20 on the bell crank lever. At its lower end the lever 26 carries a roller 29 adapted to ride in the groove of the barrel cam 14. At the front end of the shaft 27 the lever 26 is provided with a handle 30 projecting toward the left of the machine. The spring 31 connects this handle to the arm 21 of the bell crank lever and thus tends to hold the auxiliary lever 26 in the position shown in Fig. 13 with its roller 29 in the groove in the barrel cam 14. A spring 32 connected at one end to a pin 33 in the head of the machine and at the other end to the arm 20 of the bell crank lever tends to elevate the punch bar 8.

The reciprocation of the punch bar thus takes place when the parts are in the position shown in this Figure 13. It is important, however, that the downward limit of the punching stroke of the punch bar when it contacts with the anvil shall not be subject to any variation such as might arise from lost motion between the bell crank lever and auxiliary lever. This is prevented in the present invention by an overhanging arm 34 rigidly secured to the auxiliary lever 26 and contacting at its lower end 35 with the upper edge of the arm 21 of the bell crank lever.

It is important also that when the punch bar is connected from the driving mechanism and moved upwardly or into elevated position under the influence of the spring 32 that the limit of its elevated position shall be accurately defined. This is secured in the present invention by providing an adjustable stop carried by the auxiliary lever and acting when this lever is disengaged from the driving element to engage a fixed portion of the machine. This adjustable stop is shown as a set screw 36 threaded into a depending portion 37 of the arm 34 and provided with a lock nut 38 and engaging, when the punch bar is elevated, the bracket 15.

When, therefore, the operator desires to disengage the punch bar and render it idle he seizes the handle 30 pulls it forwardly thus bringing the auxiliary lever 26 into the position shown in Fig. 14 and disengaging the roller 29 from the barrel cam 14. At once the spring 32 acts to elevate the punch bar to the limit fixed by the adjustable stop 36.

The work which this machine is primarily designed to perform is the simultaneous perforation and stitching of material such as shoe parts with the row of perforations between two rows of stitchings and samples of the work are illustrated in Figures 9 and 10. Referring to Fig. 9 it will be seen that the row of punch holes or perforations 39 must be symmetrically disposed and preferably centrally disposed with respect to the two rows of stitches 40 in order to give a pleasing appearance and it is important that this relation shall be maintained around curves and angles. This result is secured in the present invention chiefly because of two features of the invention. First a novel construction of the parts is provided enabling the punch to be brought up close to the space between the needles thus preventing any material change in the relation of the punch holes to the stitches throughout curves and angles, and second by the provision of means for accurately positioning the punch holder on the punch bar both laterally and transversely and insuring its accurate vertical adjustment. All this has been rendered so positive and simple that even the most unskilled operator cannot fail to position the punch holder properly in any direction.

Figure 3:
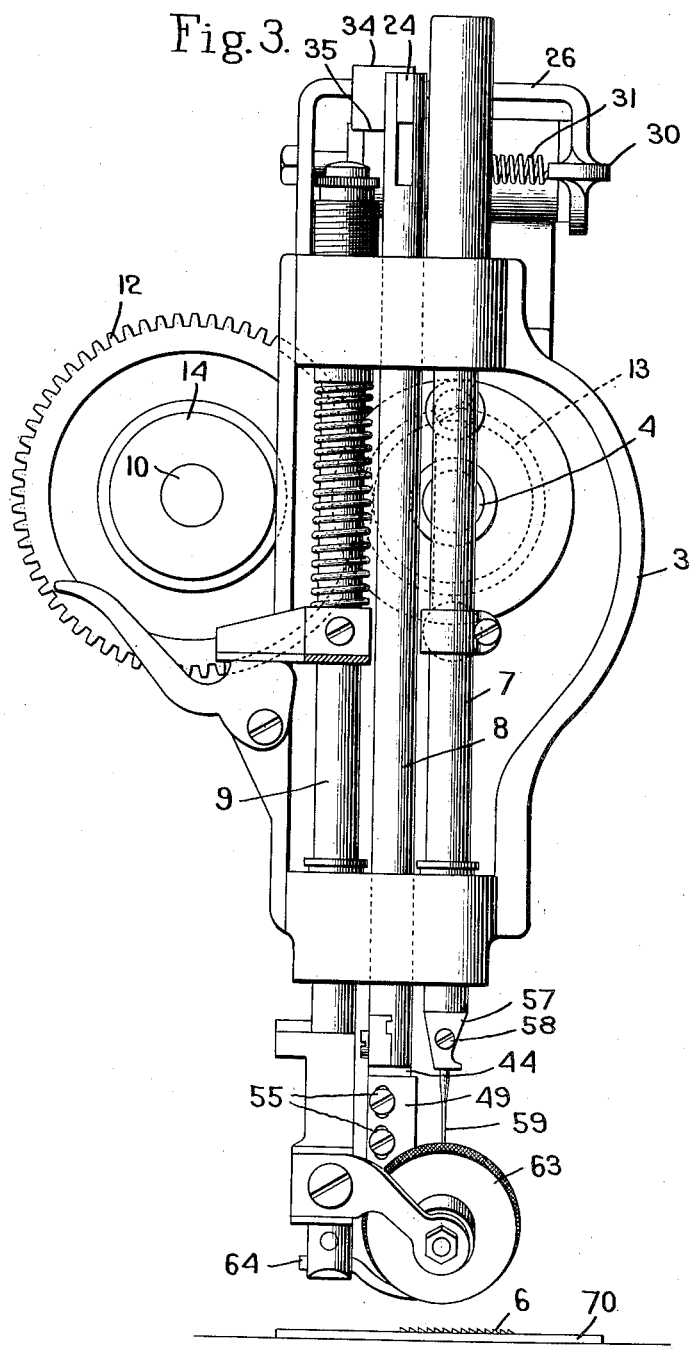
Fig. 3 is a side elevation looking toward the left of Fig. 1.

These important features of the invention are embodied in the preferred construction illustrated. The punch bar 8 at its lower end is rectangular in shape. This is preferably secured by attaching to the punch bar 8 as a continuation thereof a rectangular block 41 fitted to the punch bar and rigidly held in place by the said screw 42. This block presents at the front a flat vertical transverse face 43 (see Fig. 16) and at the left a flat vertical lateral face 44. (See Fig. 3.) At its right hand lower side the block 41 is provided with a lug 45 projecting normally thereto. In this lug is threaded vertically a set screw 46 provided with a milled head 47 and just above the head with a pair of flanges or collars presenting therebetween an annular groove 48.

The punch holder which is shown separately in Fig. 15 comprises a vertical shank 49 terminating in a forwardly projecting foot 50 in which is mounted the hollow steel punch 51. The inner surface 52 of the shank of the punch holder is vertical and flat and adapted to fit snugly against the surface 44 of the block 41. At the front of the shank 49 of the punch holder is provided with a flange 53 having an inner flat vertical surface adapted to fit against the surface 43 of the block 41. A lug 54 is secured to the face 52 of the shank of the punch holder and projects transversely therefrom. This lug is bifurcated and is adapted to fit in the groove 48 of the set screw 46 and straddle the set screw.

The punch holders for a given machine are made alike except that the foot varies according to the number and size of the punches to be used. All that the operator has to do to place a punch in position is to put the punch holder up against the block 41 on the lower end of the punch bar with the lug 54 in the groove 48 and push the positioning surfaces of the shank and flange of the punch holder into contact with the positioning surfaces 43 and 44 of the punch bar block 41. Thus the punch holder is positioned laterally and transversely with absolute accuracy and in a manner that may aptly be termed "fool proof." In order to adjust the punch holder vertically to bring it into proper relative position with respect to the anvil it is simply necessary to turn the set screw 47 and as this gives an exact vertical movement there is no danger of the punch holder being twisted or moved laterally or transversely. Set screws 55 passing through slots 56 in the punch holder lock it in place to the block 41 when it is in final adjusted position.

The needle bar 7 at its lower end carries a needle holder 57 in which are mounted the two needles for performing the stitching operation. In this invention the set screws 58 which lock the needles 59 in position are placed at the opposite sides of the needle holder 57 permitting the rear face of the block to be shaped so that the foot of the punch holder may be brought close up to the needles. This proximity of position of the punch to the needles is further secured in this invention by providing the rear of the needle holder with a vertical recess 60 in line with the space between the needles and of a shape and size to receive the toe of the punch carrying foot 50. This recess 60 is made of sufficient length so that when the punch bar is in its idle elevated position determined by the stop 36 the upper end of the recess will not engage the top of the toe of the punch holder when the needle bar reaches the downward limit of its stroke.

This invention by means of which the toe of the punch is brought in close proximity to the needles enables a plurality of punches to be used on a single punch holder thus enabling work of a highly ornamental character such as shown in Fig. 10 to be performed in a single machine for even in stitching about curves and angles the punch holes will not substantially change their symmetrical relation with respect to the lines of stitching. In Figs. 11 and 12 the toe of the punch holder is shown as provided with a relatively large punch 61 and in the rear thereof with two relatively small punches 62 adapted to make the work shown in Fig. 10 but other variations and combinations may be made.

The presser bar of the machine is fitted with suitable means to hold the work in engagement with the feed dog 6 and the throat plate of the machine and enable the work to be fed properly through the machine. For this purpose the usual type of rotary presser wheel 63 working at the left hand side of the lines of stitching is illustrated. But this invention provides a novel form of presser foot which may be used alone or in connection with the presser wheel 63 and which acts to hold the work both where the stitching operation and the punching operation is being performed and thus greatly to assist in the accuracy of the work. This presser foot which is shown separately in Fig. 8 and in cross section in Fig. 4 consists simply of a curved flat properly shaped piece of metal having at its rear end a shank 64 clamped by the set screw 65 and block 66 in the lower end of the presser bar 9. At its extreme forward end the presser foot is formed to present a narrow upwardly curved toe 67 which enters between the needle paths and thus holds the work down firmly at the stitching point. Beneath the path of the punch the presser foot is provided with an aperture 68 allowing the punch to pass freely therethrough but holding the work firmly down immediately about the punch. The presser foot is also provided in its under surface with a groove 69 extending rearwardly from the aperture 68 to permit any punchings which may feed up through the punch and fall back into the aperture 68 to pass out rearwardly with the material and without being caught in the stitching. This presser foot enables the operator at all times to have a clear view of the needles and the punch in performing their operations while at the same time it securely and firmly holds the work and thus enables the feeding operation upon which the spacing of the stitches and the punch holes depend to proceed accurately and regularly.

Beneath the presser feet the bed plate 1 is provided with the usual throat plate 70 through which the feed dog operates, in which apertures 71 are provided for the needles and in which a suitable anvil 72 is mounted to co-operate with the punch.

While the two flat guiding and positioning surfaces between the shank of the punch holder and the block 41 or lower end of the punch bar are sufficient to position and guide the punch holder accurately when placed in position and adjusted, three or more such co-operating surfaces may be employed and as illustrating this feature Fig. 17 shows an additional flange 73 having an internal flat vertical surface to fit against the corresponding surface on the block 41.

Having thus described my invention, what I claim as new, and desire to secure by Letters Patent, is:

1. A stitching and perforating machine comprising a head, reciprocating punch and needle bars mounted vertically in the head, a punch holder secured to the punch bar and having a horizontal punch carrying foot, a needle holder secured to the needle bar and supporting two transversely spaced needles and a vertical recess in the rear of the needle holder in line with the space between the needles to receive the toe of the punch carrying foot and permit the punch to act close to the needles.

2. A stitching and perforating machine comprising a vertically reciprocating punch bar presenting at its lower end lateral and transverse vertical positioning surfaces, a punch holder having corresponding co-operating surfaces whereby upon bringing the two sets of surfaces into contact the punch holder is accurately positioned both laterally and transversely, and means mounted in one of said parts and interengaged with the other and acting when operated to adjust the punch holder vertically either up or down as required.

3. A stitching and perforating machine comprising a vertical reciprocating punch bar presenting at its lower end lateral and transverse vertical positioning surfaces, a punch holder having corresponding co-operating surfaces whereby upon bringing the two sets of surfaces into contact, the punch holder is accurately positioned both laterally and transversely, a lug secured to and projecting normally to the punch bar, a lug secured to and projecting normally to the punch holder, and a vertical set screw threaded through the punch bar lug and provided with a horizontal groove straddling the punch holder lug whereby the punch holder may be accurately adjusted vertically.

4. In a machine of the character described a reciprocable punch bar, a main lever connected to the punch bar, a driving element, an auxiliary lever mounted on the main lever to rock therewith and slidable with respect to the main lever into and out of engagement with the driving element, and an adjustable stop carried by the auxiliary lever acting when said lever is disengaged from the driving element to engage a fixed portion of the machine and limit the elevated position of the punch bar.

5. In a machine of the character described a reciprocable punch bar, a main lever connected to the punch bar, a driving element, an auxiliary lever mounted on the main lever to rock therewith and slidable with respect to the main lever into and out of engagement with the driving element, and an arm rigidly connected to the auxiliary lever and extending over and engaging the main lever when on its punching movement whereby the limit of the punching stroke of the punch bar is not subject to variation from lost motion between the levers.

6. A stitching and perforating machine comprising vertically reciprocating punch and needle bars, a pair of transversely spaced needles mounted in the needle bar, a punch mounted on the punch bar and acting in line with the space between the needles, and a presser foot extending forwardly beneath the punch and needle bars having an aperture to permit the punch to move vertically therethrough, and a toe projecting between the needle paths whereby the work being operated upon is firmly held adjacent the needles and punch.

7. A stitching and perforating machine having the construction defined in claim 6 in which the said presser foot is provided with a groove in its under surface extending rearwardly from the aperture to permit any punchings falling into the aperture to feed out therethrough.

In testimony whereof, I have signed my name to this specification.

JOHN McPHERSON COOKE.